(12) United States Patent
Brown et al.

(10) Patent No.: US 7,245,813 B2
(45) Date of Patent: Jul. 17, 2007

(54) DUST CAP FOR AN OPTICAL FERRULE

(75) Inventors: Matthew A. Brown, Hickory, NC (US); Darrell R. Childers, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 11/156,876

(22) Filed: Jun. 20, 2005

(65) Prior Publication Data
US 2006/0285814 A1   Dec. 21, 2006

(51) Int. Cl.
*G02B 6/36* (2006.01)
(52) U.S. Cl. .......................... 385/139; 385/134; 385/53
(58) Field of Classification Search ...................... None
See application file for complete search history.

(56) References Cited

U.S. PATENT DOCUMENTS

| | | | |
|---|---|---|---|
| 5,414,790 A | 5/1995 | Lee et al. ................... 385/139 |
| 6,227,717 B1 * | 5/2001 | Ott et al. ....................... 385/53 |
| 6,275,633 B1 | 8/2001 | Lei ............................. 385/100 |
| D459,318 S | 6/2002 | Theuerkorn | |
| 6,547,450 B2 * | 4/2003 | Lampert ....................... 385/78 |
| 6,712,524 B2 * | 3/2004 | Beatty et al. ................. 385/72 |
| 6,736,548 B2 | 5/2004 | Tanaka et al. ................ 385/78 |
| 2002/0013076 A1 * | 1/2002 | Akeda et al. ............... 439/135 |

* cited by examiner

*Primary Examiner*—Frank G. Font
*Assistant Examiner*—Eric Wong
(74) *Attorney, Agent, or Firm*—Michael L. Leetzow, P.A.

(57) ABSTRACT

A dust cap for an optical ferrule is provided that has a sleeve with a first end and second end, the second end having at least one depression configured to engage a portion of the end face of an optical ferrule. The dust cap prevents dirt and debris from contaminating the front face of the optical ferrule if the optical ferrule has open guide pin holes.

20 Claims, 9 Drawing Sheets

DUST CAP FOR AN OPTICAL FERRULE

The present invention relates to a dust cap for an optical ferrule, and more particularly, a dust cap that seals the front face of the optical ferrule around a portion of the front face of the optical ferrule.

There are prior art dust caps for optical ferrules. However these prior art dust caps generally seal around the circumference of the optical ferrules and do not specifically seal off the end face of the optical ferrules. Thus, when the optical ferrule has guide pin holes that are open, dust and debris can penetrate through the open guide pins and contaminate the front face of the optical ferrules. Additionally, the edges may not be completely sealed, allowing dust and debris to accumulate on the front face of the optical ferrule.

Accordingly, the present invention is directed to dust cap that substantially obviates one or more of the problems and disadvantages in the prior art. Additional features and advantages of the invention are set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a dust cap for a optical ferrule for sealing at least a portion of an end face of the optical ferrule that includes a sleeve extending lengthwise between opposed first and second ends, said sleeve defining a lengthwise extending opening that opens through the first end for receiving at least a portion of the optical ferrule, and an end portion for sealing the second end of said sleeve, the end portion having an inside surface and an outside surface, the inside surface of the end portion having at least one depression and having at least a portion configured to engage at least a portion of the end face of the optical ferrule.

In another aspect, the invention provides for a dust cap for a optical ferrule for sealing at least a portion of an end face of the optical ferrule that includes a sleeve extending lengthwise between opposed first and second ends, said sleeve defining a lengthwise extending opening that opens through the first end for receiving at least a portion of the optical ferrule, an end portion for sealing the second end of said sleeve, at least two flanges at the first end, the at least two flanges being on opposite sides of the sleeve to frictionally engage the optical ferrule, and an internal chamfer in a medial portion of the sleeve that extends inward for engaging the optical ferrule on at least two sides of the optical ferrule.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTION

A dust cap 100 according to one embodiment of the present invention is illustrated in FIGS. 1-6. The dust cap 100 has a sleeve 102 extending between a first end 104 and a second end 106. The sleeve 102 defines a lengthwise extending opening 108 through the first end 104. At the second end 106 of dust cap 100, an end portion 110 seals the sleeve 102. The end portion 110 has an inside surface 112 and an outside surface 114.

The inside surface 112 preferably has a portion 116 that is flat to engage the end face of an optical ferrule 130. See, e.g., FIGS. 4 and 6. The inside surface 112 also has at least one depression 118 therein and more preferably three depressions 118,120,122. The depression 118 generally corresponds to an area that is slightly larger than the area where the optical fibers (not shown) protrude from the end face of the optical ferrule 130. While the depression 118 is relatively deep and rectangular, it could be shallower, deeper, or have any other appropriate shape. The two depressions 120,122 generally correspond to guide pins that may extend through the front face of the optical ferrule 130. As with the depression 118, the depressions 120,122 may be deeper or shallower (as long as they accommodate the guide pins in the optical ferrule) and have a different shape than the circular one illustrated in the figures.

The inside surface 112 also has a depression 124 that preferably extends around the periphery of the inside of the sleeve 102. The depression 124, best seen in FIGS. 4-6, allows the optical ferrule 130 to fully engage the flat portion 116 without contacting the sidewalls 126 of the sleeve 102. It is preferably that the optical ferrule not contact the side walls 126, which may prevent the optical ferrule 130 from contacting the flat portion 116 and sealing the end face of the optical ferrule 130.

Figure 6:
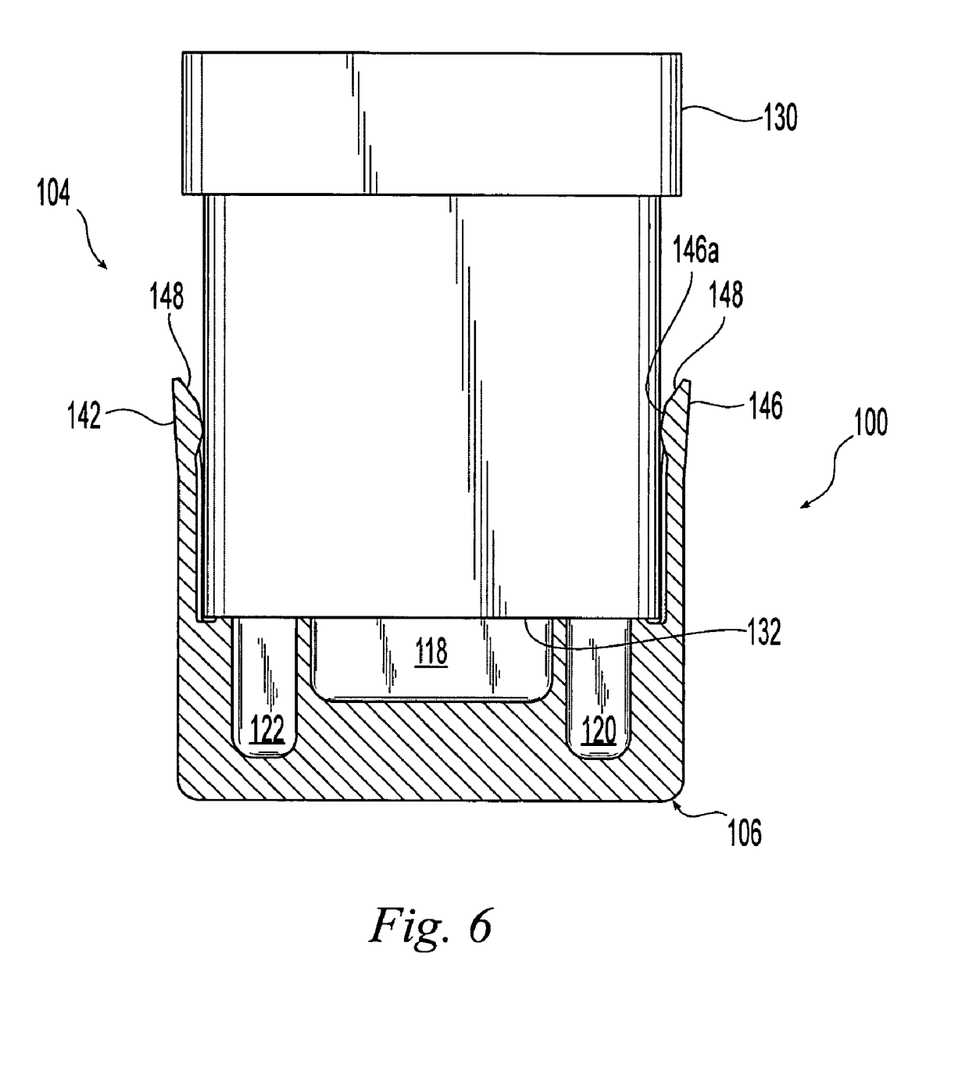
FIG. 6 is a cross section of the dust cap along lines 6-6 in FIG. 3 with an optical ferrule inserted into the dust cap.

When an optical ferrule is inserted into the dust cap 100, the optical ferrule 130 is pushed so that its front face 132 contacts the flat portion 116 of the inside surface 112. As the portion 116 fully contacts the front face 132 of the optical ferrule, the portion of the optical ferrule open to the depressions are each sealed off keeping the area around the optical fibers extending through the front face of the optical ferrule clean and free of dirt and debris. This is particularly true if the optical ferrule, as illustrated in FIG. 6, does not have guide pins inserted therein. It has been discovered that when other dust caps are used on optical ferrules that do not have guide pins inserted into the guide pin holes 134, dust and debris can enter through the open guide pin holes and accumulate on the front face of the optical ferrule if the area around the optical ferrules is not sealed, causing problems with mating the optical ferrules.

Figure 1:
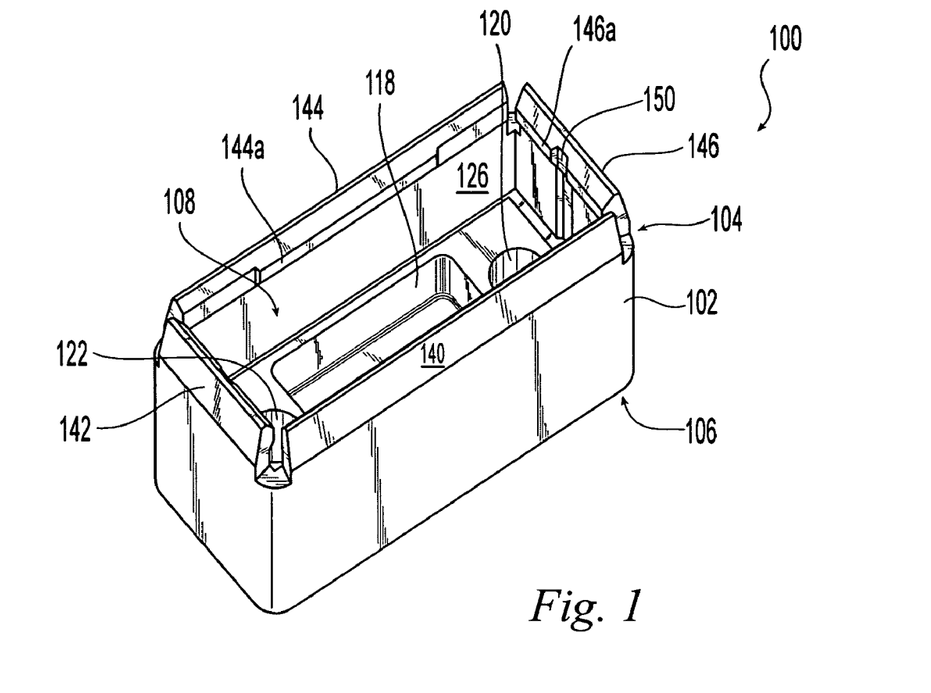
FIG. 1 is a perspective view from the first end of a dust cap according to one embodiment of the present invention.
Figure 2:
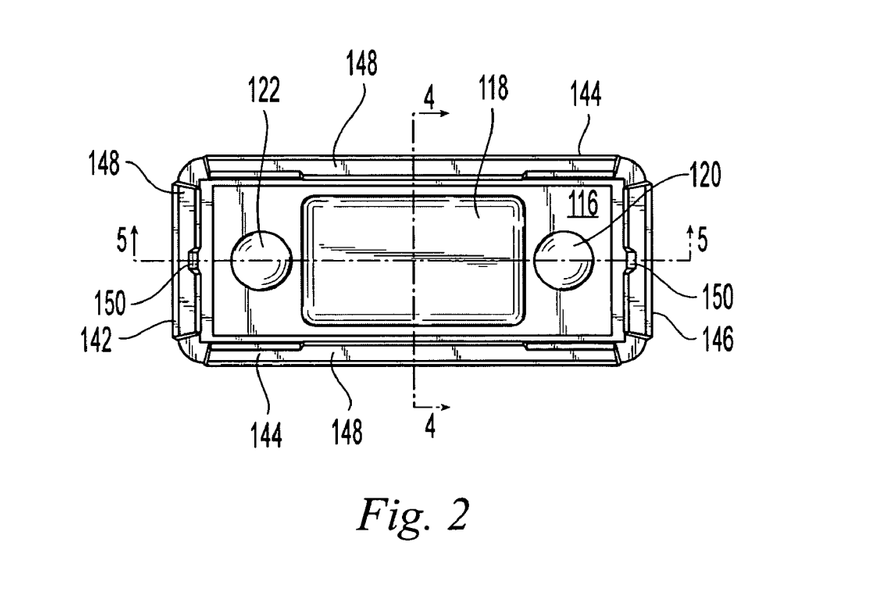
FIG. 2 is a top view into the first end of the dust cap of FIG. 1.
Figure 3:
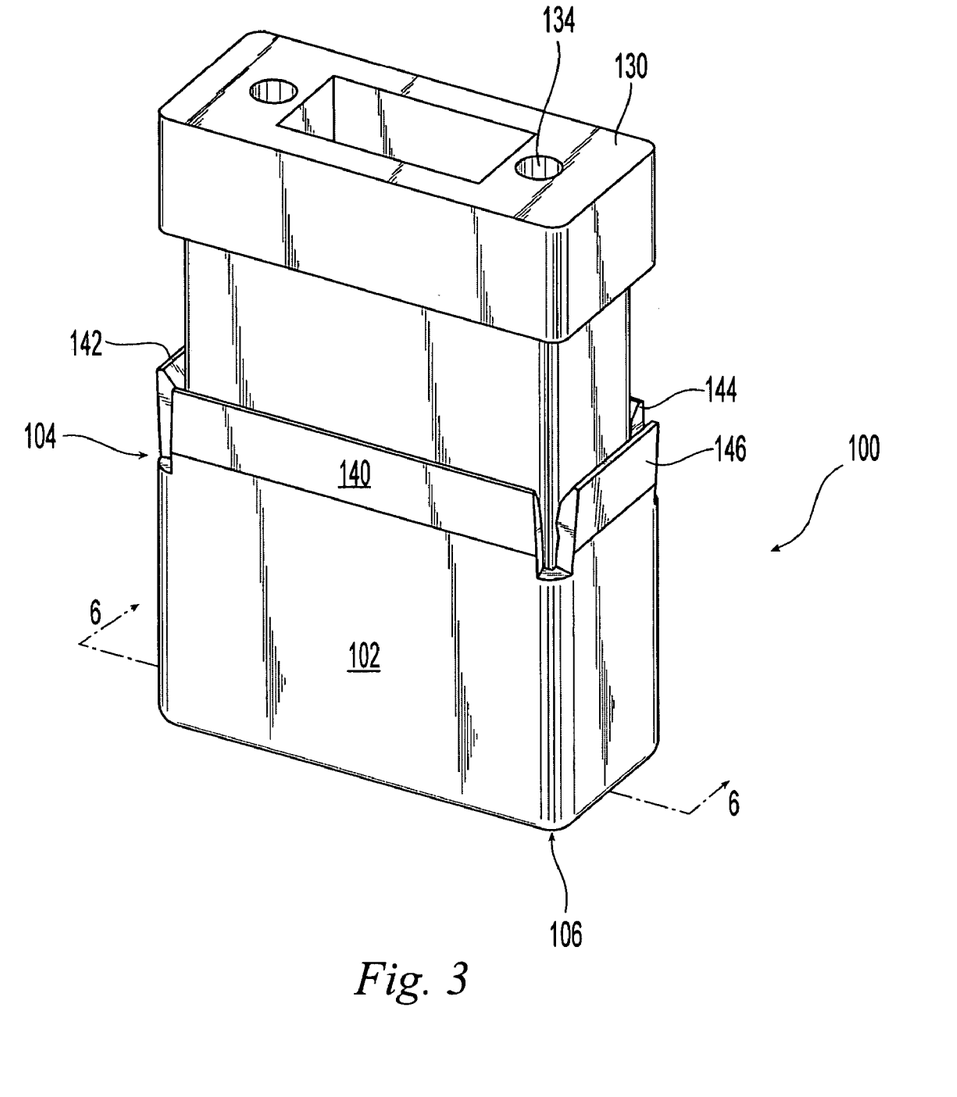
FIG. 3 illustrates an optical ferrule inserted into the dust cap of FIG. 1.
Figure 4:
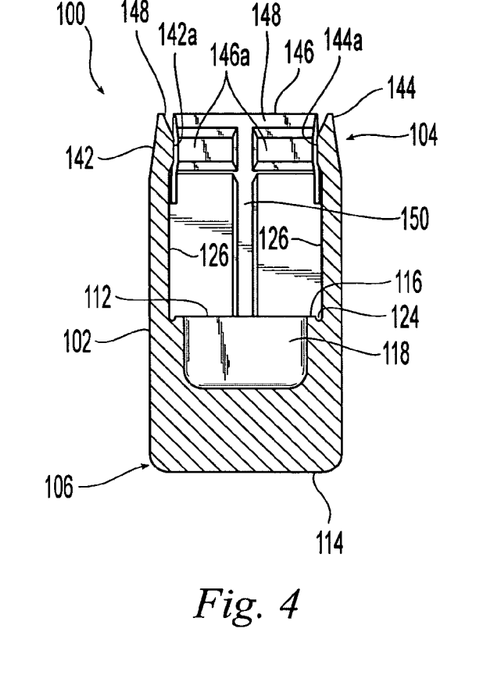
FIG. 4 is a cross section of the dust cap along lines 4-4 in FIG. 2.
Figure 4A:
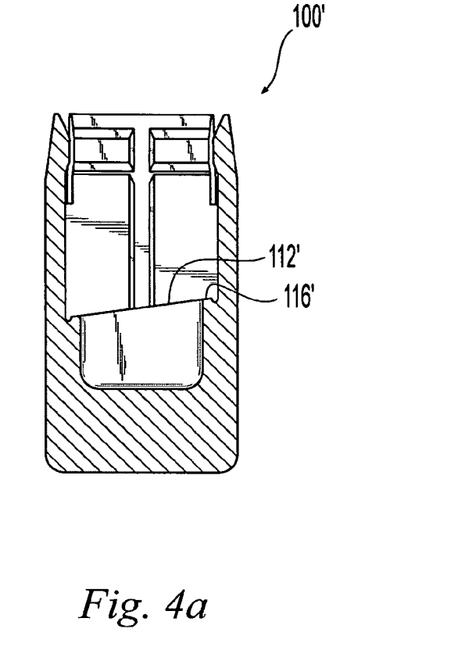
FIG. 4a is a cross section of another embodiment of a dust cap according to the present invention.
Figure 5:
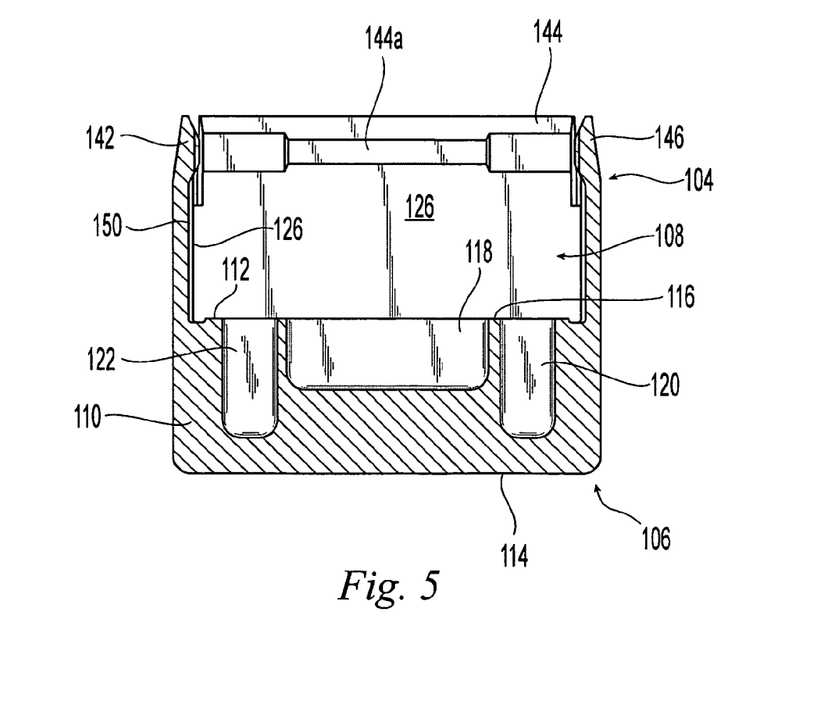
FIG. 5 is a cross section of the dust cap along lines 5-5 in FIG. 2.

The front face 132 of the optical ferrule 130 are typically polished to allow for proper optical transmission to another optical ferrule. Optical transmission between two optical ferrules is better when the front face of optical ferrules are polished at an 8° angle. As illustrated in FIG. 4a, the present invention includes a dust cap 100' that is the same as dust cap 100 except that that inside surface 112' has a corresponding 8° angle (or any other appropriate angle) to accommodate the angle on the optical ferrule. With the inside surface 112' having an angle and the flat portion 116' also having the same 8° angle, the front face of the polished optical ferrule will also be sealed.

The dust cap 100 also preferably has at the first end 104 flanges 140,142,144,146 to frictionally engage the optical ferrule 130. The flanges 140,142,144,146 preferably each have at least one extension pad (140a,142a,144a,146a) integral therewith to frictionally engage the optical ferrule when it is inserted. The flanges 140,142,144,146 may also be formed so that they slightly extend toward the opening 108 to further ensure the engagement of the optical ferrule. While four flanges are illustrated in the figures, the invention also contemplates having only two flanges on opposites sides of the opening 108. For example, only the flanges 140,144 may be present and with those flanges being on the longer sides of the dust cap 100, they would engage the optical ferrule more than if the flanges 142,146 were the only flanges to engage the optical ferrule.

While the flanges 140,142,144,146 are tilted slightly inward toward the opening 108, they need not be. For example, they could extend parallel to the outside walls. The inside surface of each of the flanges 140,142,144,146 also preferably has a chamfered portion 148 at the top of the flange to assist the insertion of the optical ferrule 130 into the dust cap 100. As illustrated best in FIGS. 4 and 5, the extension pad 144a on the flange 144 is preferably centered along the flange 144, while the extension pad 146a on flange 146 is divided into two separate parts. The extension pads (140a,142a,144a,146a) could be placed in other portions of the flanges (140,142,144,146), be larger or smaller, or be eliminated altogether. The flanges (140,142,144,146) and the extensions pads (140a,142a,144a,146a) also assist in keeping dust and debris out of the dust cap, which may later accumulate on the front face of the optical ferrule 130.

The dust cap 100 also has at least one groove 150 on at least two of the sidewalls 126 that preferably extends from the first end 104 to the inside surface 112. This groove 150 accommodates a mold line on the optical ferrule 130, to the extent that the optical ferrule 130 has a mold line. The groove 150 is not intended to provide the only escape route for any air that may be trapped between the end portion and the optical ferrule, as there is preferably sufficient space between the optical ferrule 130 and the side walls 126 for the air to escape as the optical ferrule 130 is inserted.

It should be noted that the dust cap 100 has a generally rectangular shape to accommodate an MT ferrule, but can be appropriately shaped for any other configuration of optical ferrule. For example, the dust cap 100 could be cylindrical or oval to accommodate a circular or oval optical ferrule.

Figure 7:
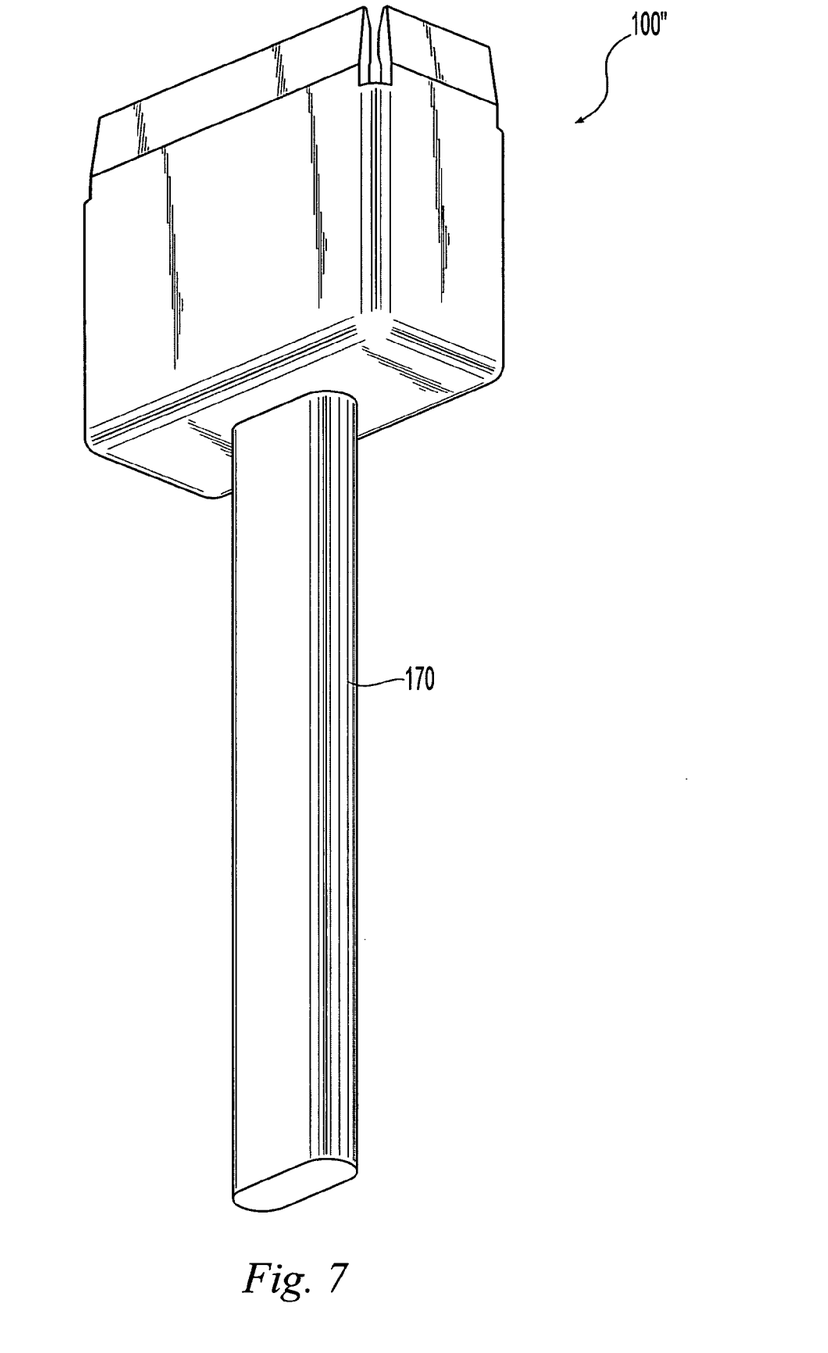
FIG. 7 is a perspective view of a dust cap according to another embodiment of the present invention.

FIG. 7 illustrates another embodiment of a dust cap 100" according to the present invention. The dust cap 100" is the same as the prior embodiment, except for the addition of the elongated extension 170. The elongated extension allows for the dust cap 100" to be removed from or placed on an optical ferrule that is already installed in a sleeve or fiber optic cabinet. Having a dust cap 100" with an elongated extension 170 allows the dust cap to be removed without having to remove the connector from the sleeve or fiber optic cabinet. The user can simply access the dust cap 100" from the opposite side of the connector sleeve or cabinet.

Figure 8:
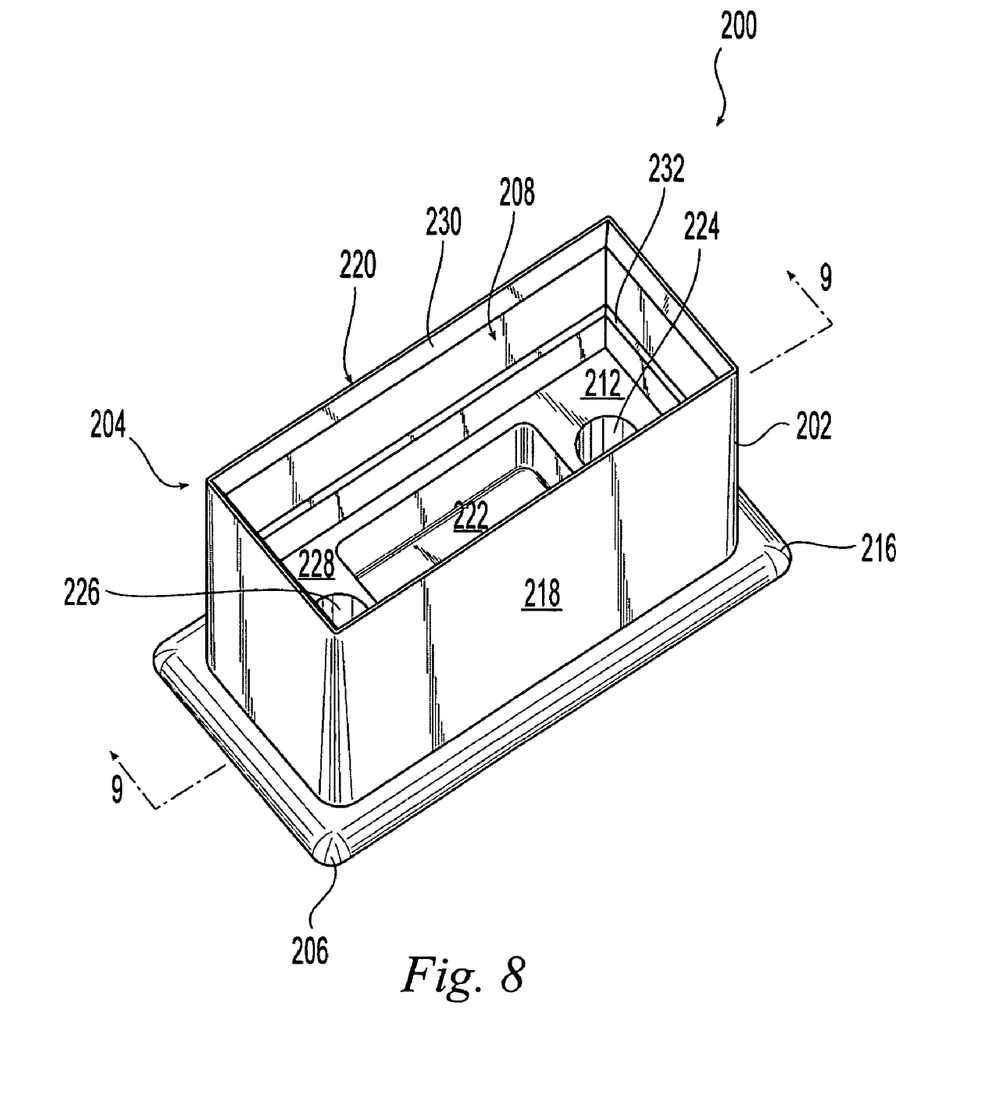
FIG. 8 is a perspective view from the first end of a dust cap according to another embodiment of the present invention.
Figure 9:
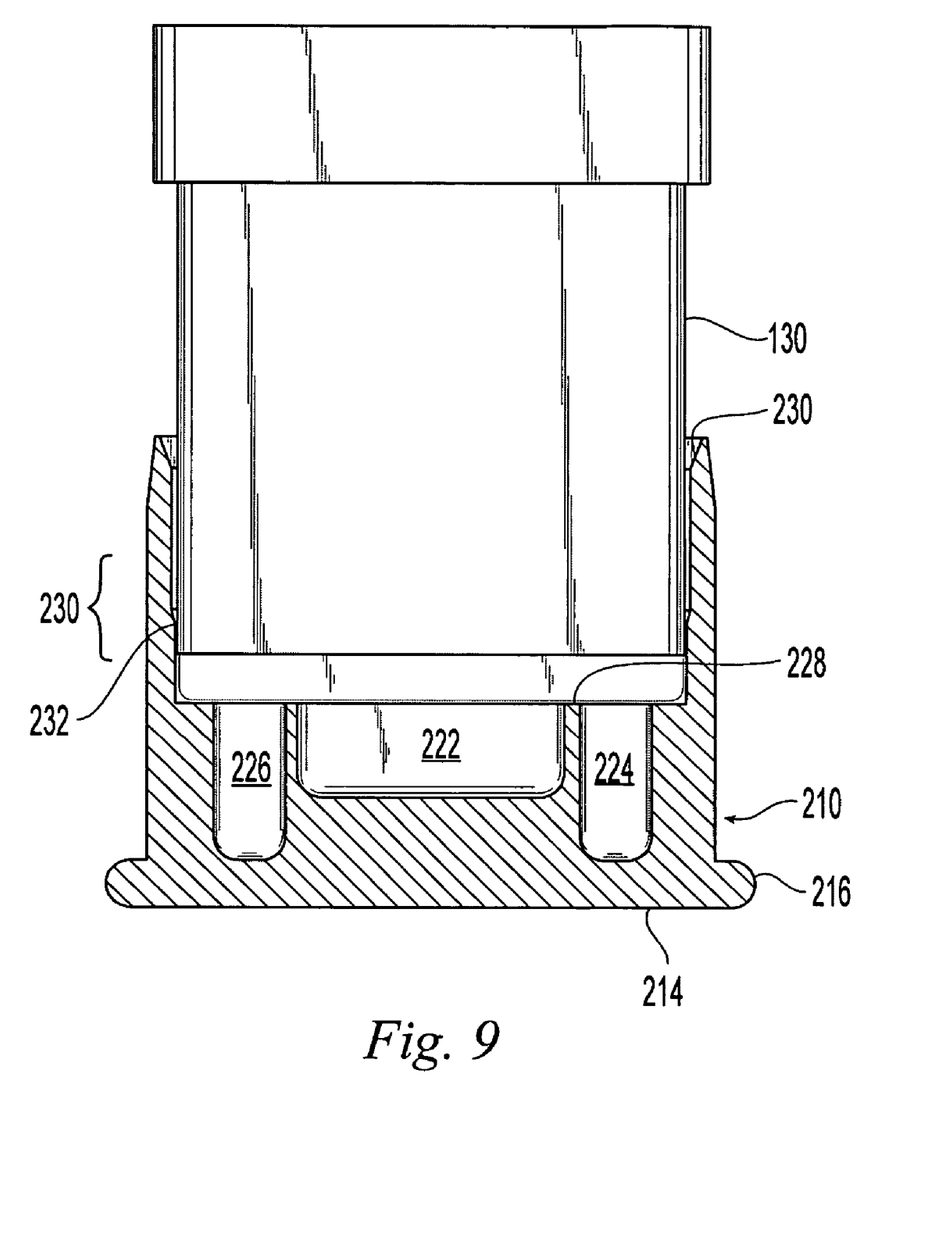
FIG. 9 is a cross sectional view of the dust cap of FIG. 8 along the lines 9-9 with an optical ferrule inserted therein.

Another embodiment of a dust cap 200 is illustrated in FIGS. 8 and 9. Dust cap 200 has a sleeve 202 extending between a first end 204 and a second end 206. The sleeve 202 defines a lengthwise extending opening 208 through the first end 204. At the second end 206 of dust cap 200, an end portion 210 seals the sleeve 202. The end portion 210 has an inside surface 212 and an outside surface 214. The second end 206 has an integral extension 216 extending outwardly around the periphery of the dust cap 200. The extension 216, an integral part of the dust cap 200, allows for a user to grasp the dust cap 200 easier for removal. The extension 216 need not extend completely around the periphery, but could only extend around a portion or only along a part of the sides of the dust cap. For example, the extension 216 may extend only a portion of the long sides 218,220.

The inside surface 212 of the dust cap 200 has at least one depression 222 therein and more preferably three depressions 222,224,226. The depressions are similar to those in dust cap 100. Similarly, the inside surface 212 preferably has a portion 228 that is flat to engage the end face of an optical ferrule 130. However, the flat portion 228 preferably extends out to the sleeve walls. The sleeve has a medial portion 230, where an internal chamfer 232 is located. The internal chamfer 232 extends into the opening 208 to contact at least two of the sides of the optical ferrule 130. While it is preferable that the chamfer contacts all four of the sides of the optical ferrule, it is not necessary since the front face of the optical ferrule is sealed by the flat portion 228 of the inside surface 212.

The dust cap 200 also does not have flanges at the first end 204 as with the previous embodiment. However, the dust cap 200 preferably has a chamfer 230 on the inside portion of the first end 204 to assist in guiding the optical ferrule 130 into the opening 208 of dust cap 200.

Figure 10:
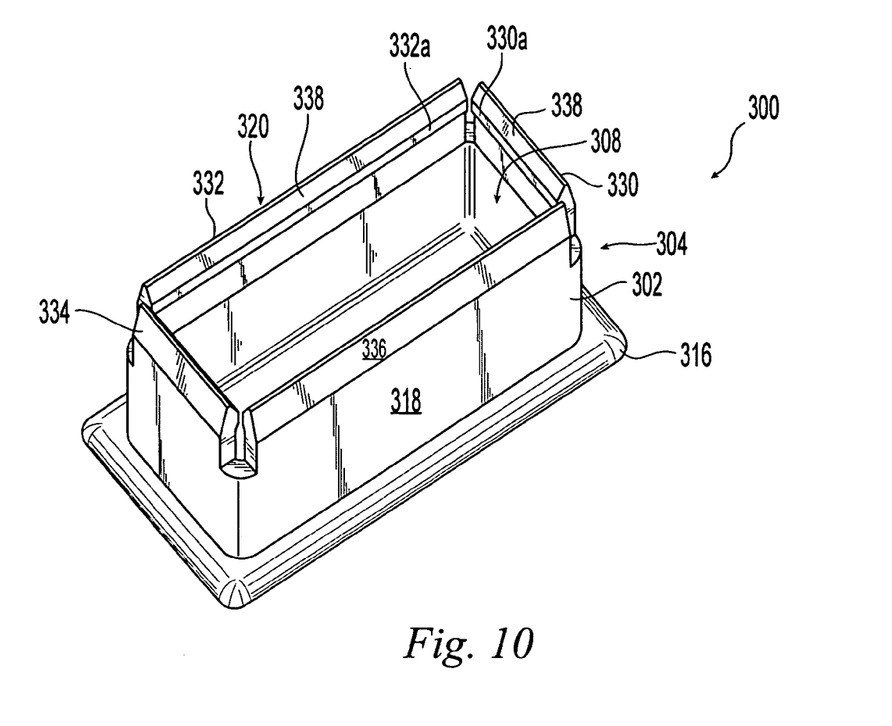
FIG. 10 is a perspective view from the first end of a dust cap according to another embodiment of the present invention.
Figure 11:
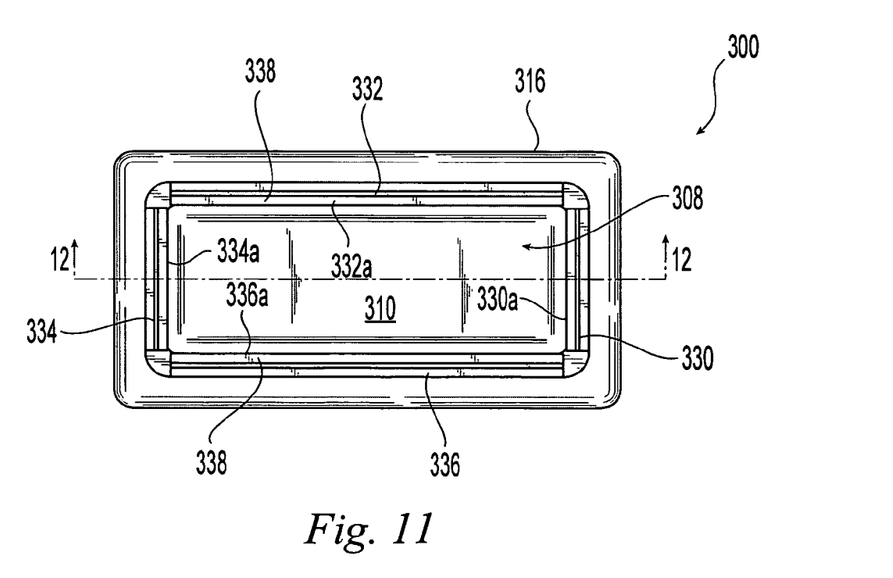
FIG. 11 is an end view of the dust cap of FIG. 10.
Figure 12:
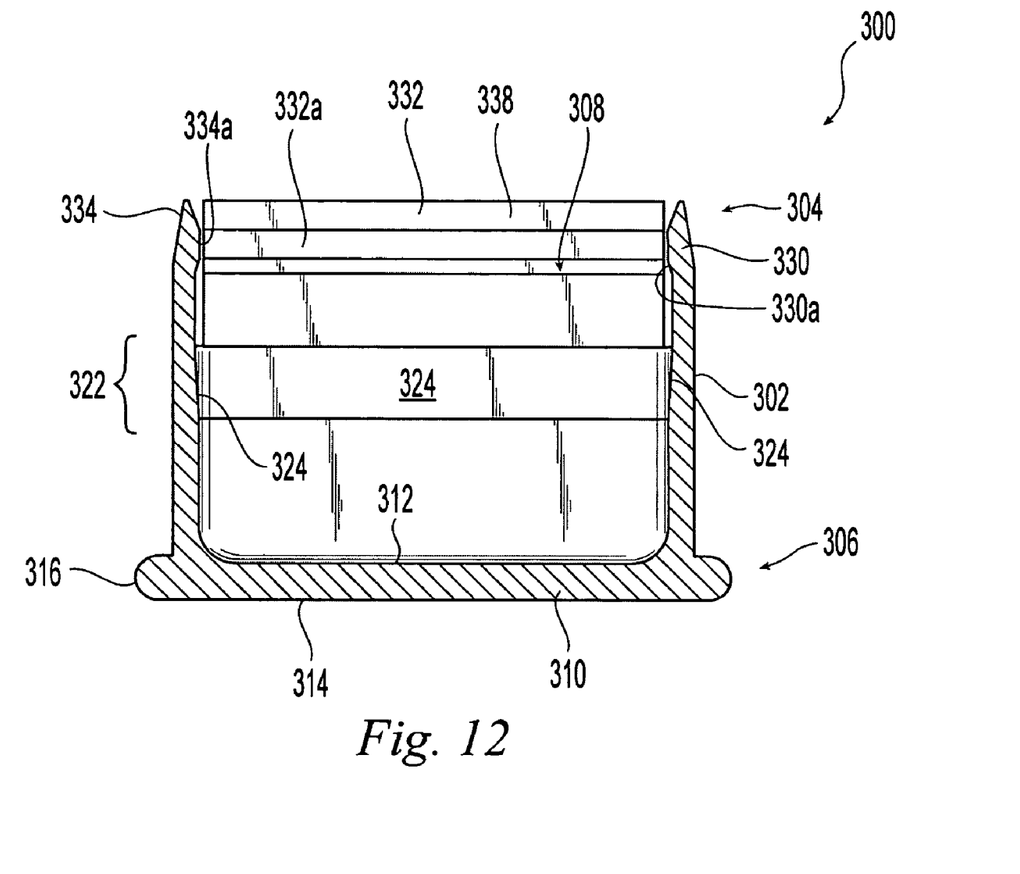
FIG. 12 is a cross sectional view of the dust cap along the lines 12-12 in FIG. 11.

Another embodiment of a dust cap 300 according to the present invention is illustrated in FIGS. 10-12. Dust cap 300 has a sleeve 302 extending between a first end 304 and a second end 306. The sleeve 302 defines a lengthwise extending opening 308 through the first end 304. At the second end 306 of dust cap 300, an end portion 310 seals the sleeve 302. The end portion 310 has an inside surface 312 and an outside surface 314. The second end 306 has an extension 316 extending outwardly around the periphery of the dust cap 300. The extension 316, an integral part of the dust cap 300, allows for a user to grasp the dust cap 300 easier for removal. The extension 316 need not extend completely around the periphery, but could only extend around a portion or only along a part of the sides of the dust cap. For example, the extension 316 may extend only a portion of the long sides 318,320.

The inside surface 312 of the dust cap 300 is preferably generally smooth and does not have the depressions of the prior embodiments. The inside surface 312 also does not have a flat surface to engage the front face of the optical ferrule to protect it from the dirt and debris. Rather, the dust cap 300 has a medial portion 322, where an internal chamfer 324 is located. The internal chamfer 324 extends into the opening 308 to contact at least two of the sides of an optical ferrule. It is preferable that the internal chamfer 324 contacts all sides of the optical ferrule.

The dust cap 300 also preferably has at the first end 304 flanges 330,332,334,336 to frictionally engage an optical ferrule. The flanges 330,332,334,336 preferably each have at least one extension pad (330a,332a,334a,336a) integral therewith to frictionally engage the optical ferrule when it is inserted. Similarly, the flanges 330,332,334,336 also preferably have a chamfer 338 on the inside surface to assist with the optical ferrule being inserted into the opening 308.

It will be apparent to those skilled in the art that various modifications and variations can be made to the transition assembly and the method of making a transition assembly without departing from the spirit or scope of the invention. Thus, it is intended that the present invention cover the modifications and variations of this invention provided they come within the scope of the appended claims and their equivalents.

We claim:

1. A dust cap for a optical ferrule for sealing at least a portion of an end face of the optical ferrule, the dust cap comprising:
    a sleeve extending lengthwise between opposed first and second ends, said sleeve defining a lengthwise extending opening that opens through the first end for receiving at least a portion of the optical ferrule; and
    an end portion for sealing the second end of said sleeve, the end portion having an inside surface and an outside surface, the inside surface of the end portion having at least one depression and having at least a portion configured to engage at least a portion of the end face of the optical ferrule and the at least a portion configured to extend across the end face of the optical ferrule in at least one direction.

2. The dust cap according to claim 1, wherein the at least one depression in the end portion corresponds to and accommodates optical fibers extending through the front face of the optical ferrule.

3. The dust cap according to claim 1, wherein the dust cap is comprised of materials in the group including thermoplastic polymers and thermoplastic elastomers.

4. The dust cap according to claim 1 wherein the at least one depression comprises three depressions.

5. The dust cap according to claim 4 wherein the three depressions correspond to and accommodate optical fibers and guide pins extending through the front face of the optical ferrule.

6. The dust cap according to claim 1, wherein the at least a portion configured to engage at least a portion of the end portion comprises an area surrounding the at least one depression to seal off optical fibers extending through the front face of the optical ferrule.

7. The dust cap according to claim 1, the sleeve having a medial portion, and the medial portion of the sleeve defines an internal chamfer that extends inward for engaging at least two sides of the optical ferrule.

8. The dust cap according to claim 7, wherein the internal chamfer engages four sides of the optical ferrule.

9. The dust cap according to claim 1, further comprising at least two flanges at the first end, the at least two flanges being on opposite sides of the sleeve to frictionally engage the optical ferrule.

10. The dust cap according to claim 9, wherein the at least two flanges at the first end comprises two sets of two flanges, each of the sets of two flanges being on opposite sides of the sleeve to frictionally engage the optical ferrule.

11. The dust cap according to claim 1 further comprising an elongated extension attached to the outside surface of the second end of the dust cap.

12. The dust cap according to claim 1, wherein the second end of the sleeve has an extension extending outwardly from the sleeve.

13. The dust cap according to claim 1, wherein the sleeve has a groove opening into the lengthwise extending opening, the groove extending from the first end to the inside surface of the end portion.

14. The dust cap according to claim 1, wherein the inside surface has a slope of about 8°.

15. The dust cap according to claim 1, wherein the dust cap is configured for an MT ferrule.

16. A dust cap for a optical ferrule for sealing at least a portion of an end face of the optical ferrule, the dust cap comprising:
    a sleeve extending lengthwise between opposed first and second ends, said sleeve defining a lengthwise extending opening that opens through the first end for receiving at least a portion of the optical ferrule;
    an end portion for sealing the second end of said sleeve;
    at least two flanges at the first end, the at least two flanges being on opposite sides of the sleeve to frictionally engage the optical ferrule; and
    an internal chamfer in a medial portion of the sleeve that extends inward for engaging the optical ferrule of at least two sides of the optical ferrule.

17. The dust cap according to claim 16, wherein the internal chamfer engages the optical ferrule on four sides.

18. The dust cap according to claim 16, wherein the at least two flanges at the first end comprises two sets of two flanges, each of the sets of two flanges being on opposite sides of the sleeve to frictionally engage the optical ferrule.

19. The dust cap according to claim 16, the end portion has an inside surface and an outside surface, the inside surface of the end portion having at least one depression and having at least a portion of configured to engage at least a portion of the end face of the optical ferrule.

20. The dust cap according to claim 16, wherein the second end of the sleeve has an extension extending outwardly from the sleeve.

* * * * *